United States Patent
Pean et al.

(10) Patent No.: US 9,626,310 B2
(45) Date of Patent: Apr. 18, 2017

(54) MICROCONTROLLER ARCHITECTURE WITH ACCESS STEALING

(71) Applicant: Atmel Corporation, San Jose, CA (US)

(72) Inventors: Guillaume Pean, Aix en Provence (FR); Renaud Tiennot, Aix en Provence (FR); Vincent Debout, La Ciotat (FR)

(73) Assignee: Atmel Corporation, San Jose, CA (US)

( * ) Notice: Subject to any disclaimer, the term of this patent is extended or adjusted under 35 U.S.C. 154(b) by 45 days.

(21) Appl. No.: 14/835,418

(22) Filed: Aug. 25, 2015

(65) Prior Publication Data

US 2017/0060787 A1  Mar. 2, 2017

(51) Int. Cl.
  *G06F 13/16* (2006.01)
  *G06F 13/20* (2006.01)
  *G06F 13/40* (2006.01)

(52) U.S. Cl.
  CPC .......... *G06F 13/1668* (2013.01); *G06F 13/20* (2013.01); *G06F 13/4027* (2013.01); *G06F 13/4068* (2013.01)

(58) Field of Classification Search
  CPC .............................. G06F 13/20; G06F 13/4027
  See application file for complete search history.

(56) References Cited

U.S. PATENT DOCUMENTS

2003/0217216 A1* 11/2003 Rowlands ............. G06F 12/082
                                                                710/305
2006/0150011 A1*  7/2006 Ju ....................... G06F 11/1666
                                                                 714/14

* cited by examiner

*Primary Examiner* — Idriss N Alrobaye
*Assistant Examiner* — Ronald Modo
(74) *Attorney, Agent, or Firm* — Fish & Richardson P.C.

(57) ABSTRACT

A microcontroller system is disclosed that includes an access stealing monitor coupled to a bus that is configured to receive a first access request from the bus for a first peripheral, duplicate the first access request, transform the first access request to a second access request on a second peripheral, and transfer the second access request to the bus. In another embodiment, a first peripheral coupled to the bus is configured to receive a first access request from the bus for the first peripheral, duplicate the first access request and transform the first access request to a second access request. A second peripheral coupled to the bus and to the first peripheral is configured to receive the second access request and to respond to the second access request. Methods of access stealing in a microcontroller system are also disclosed.

18 Claims, 3 Drawing Sheets

MICROCONTROLLER ARCHITECTURE WITH ACCESS STEALING

TECHNICAL FIELD

The subject matter of this disclosure relates generally to microcontroller architectures.

BACKGROUND

When a microcontroller processes operations involving several processes that work together, large buffers of data are often manipulated resulting in a number of data transfers to and from memory. For example, the Internet protocol security (IPsec) standard is based on advanced encryption standard (AES) processes and secure hash algorithm (SHA) processes working together. Programming these processes to work together in a microcontroller includes: 1) reading a message from memory; 2) sending the message to an AES block for encryption; 3) reading the encrypted message from the AES block; 4) storing the encrypted message in memory; 5) reading the encrypted message from memory; 6) sending the encrypted message to the SHA block; 7) reading a SHA authentication tag from the SHA block; and 8) storing the authentication tag in memory. All of these read/write memory access requests imply complex programming by the software application developer to configure peripherals, direct memory access (DMA) channels, multiple interrupt monitoring and the like.

SUMMARY

In an embodiment, a system comprises: a bus; memory coupled to the bus; a first peripheral coupled to the bus; a second peripheral coupled to the bus; a controller coupled to the bus and configured to initiate access requests over the bus; and an access stealing monitor coupled to the bus. The access stealing monitor is configured to receive a first access request from the bus for the first peripheral, duplicate the first access request, transform the first access request to a second access request on the second peripheral, and transfer the second access request to the bus.

In another embodiment, a system comprises: a bus; memory coupled to the bus and a controller coupled to the bus and configured to initiate access requests over the bus. A first peripheral coupled to the bus is configured to receive a first access request from the bus for the first peripheral, duplicate the first access request and transform the first access request to a second access request. A second peripheral coupled to the bus and to the first peripheral is configured to receive the second access request and to respond to the second access request.

In another embodiment, a method comprises: initiating, by a controller, a first access request over a bus, the first access request destined for a first peripheral coupled to the bus; receiving, by an access stealing monitor coupled to the bus, the first access request; duplicating, by the access stealing monitor, the first access request; transforming, by the access stealing monitor, the first access request to a second access request on a second peripheral coupled to the bus and to the first peripheral; and transferring, by the access stealing monitor, the second access request to the bus.

In another embodiment, a method comprises: initiating, by a controller, a first access request over a bus, the first access request for a first peripheral coupled to the bus; receiving, by the first peripheral, the first access request; duplicating, by the first peripheral, the first access request; transforming, by the first peripheral, the first access request to a second access request on a second peripheral coupled to the bus and to the first peripheral; and transferring, by the first peripheral the second access request to the second peripheral.

DETAILED DESCRIPTION

A microcontroller system architecture is disclosed that reduces the number of read/write accesses for data that is used by two or more processes working together. This reduced memory access is achieved by access stealing between blocks to avoid unnecessary data manipulation. For example, if the output of a processing block A is to be stored into memory and then sent to a processing block B, then the read access on processing block A is duplicated and transformed into a write access on processing block B. Reading data on processing block A to store the data into memory will at the same time fill processing block B with the same data.

Example System

Figure 1:
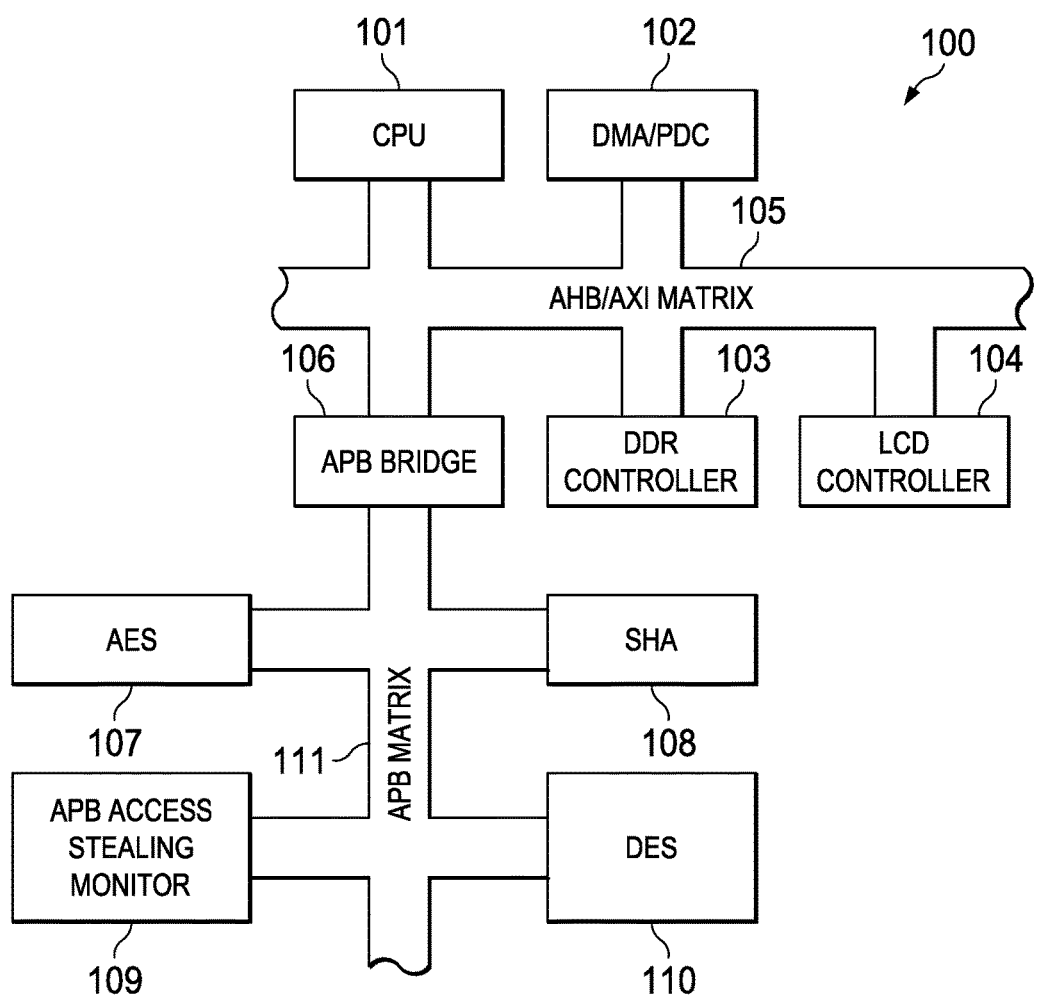
FIG. 1 is a conceptual block diagram of an example microcontroller system with access stealing, according to an embodiment.

FIG. 1 is a conceptual block diagram of an example microcontroller system 100 with access stealing, according to an embodiment. In the example embodiment shown, microcontroller system 100 can include central processing unit 101 (CPU), DMA/PDC controller 102, DDR controller 103, display controller 104 and peripheral bus bridge 106, each of which is coupled to system bus 105. Additionally, peripheral bus bridge 106 couples system bus 105 to peripheral bus 111. Several peripherals are coupled to peripheral bus 111 for implementing a security protocol layer, including access stealing monitor block 109, AES block 107, SHA block 108 and data encryption standard (DES) block 110. In practice, microcontroller system 100 can include more or fewer components or subsystems than is shown in FIG. 1. For example, access stealing monitor block 109 can be included in peripheral bridge 106 rather than a separate processing block. Also, access stealing functionality can be hardwired into processing peripherals, as described in reference to FIG. 3.

DMA/PDC controller 102 transfers data between memories and peripherals with minimal intervention by CPU 101. While CPU 101 spends time in low-power sleep modes or performs other tasks, DMA/PDC controller 102 offloads CPU 101 by taking care of data copying from one area to another. A complete DMA read and write operation between memories and/or peripherals is called a DMA transaction. A transaction is performed in data blocks and the size of the transaction (number of bytes to transfer) is selectable from software and controlled by the block size and repeat counter settings.

A PDC transfers data between on-chip serial peripherals and on and/or off-chip memories. Using the PDC removes processor overhead by reducing its intervention during the transfer. This significantly reduces the number of clock cycles required for a data transfer, which improves microcontroller system performance. To launch a transfer, the peripheral triggers its associated PDC channels by using handshake signals. When the programmed data is transferred, an end of transfer interrupt is generated by the peripheral itself.

Peripheral bridge 106 can be, for example, an advanced microcontroller bus architecture (AMBA) peripheral bus (APB). DDR controller 103 is a double data rate (DDR) memory controller used to drive DDR memory (e.g., SDRAM), where data is transferred on both rising and falling edges of the system's memory clock. Display controller 104 can be, for example a liquid crystal display (LCD) controller for running a segment of an LCD display. AES block 107 performs AES encryption/decryption processes. SHA block 108 performs SHA authentication processes. DES block performs DES encryption/decryption processes. Access stealing block 109 receives a first access request from peripheral bus 111 for a first processing block and duplicates and transforms the first access request to a second access request on a second processing block, as described in further detail with reference to FIGS. 2 and 3. System bus 105 can be, for example, an AMBA high-performance bus (AHB) or bus matrix (AXI). Peripheral bus 111 can be, for example, an APB bus matrix.

The terms "block" or "processing block" refer to one or more circuits that work together to perform one or more operations. A block may also execute software or firmware to perform the set of operations depending on the application. Although the disclosed peripherals shown in FIG. 1 perform functions to implement a security protocol layer, the disclosed embodiments are generally applicable to two or more peripherals that implement any type of chained processes where data generated by a first processing block is used by a second processing block.

In the embodiment shown in FIG. 1, system 100 implements IPsec encryption which includes an AES encryption of a message block followed by a SHA authentication of the encrypted message block. To implement an IPsec encryption, parameters for AES and SHA blocks 107, 108 are specified (e.g., encryption key, mode used, size) and then a message block is transferred from memory to a register in AES block 107 (e.g., using a first channel of DMA controller 102) where the message is AES encrypted. The AES encrypted message block is then read out from a register in AES block 107 and stored in memory (e.g., using a second channel of DMA controller 102). Each time a message block is written to AES block 102 an AES encryption is started and once the AES encryption of the message block is completed, the encrypted message block can be read. When the read access to get the AES encrypted message block occurs, the read access is duplicated and transformed by access stealing monitor block 109 into a write access on SHA block 108. Each time SHA block 108 receives an encrypted message block (e.g., a write access resulting from a duplicated/transformed AES read access) a SHA hash process is performed. When the whole encrypted message has been read out from AES block 107 and stored in the memory, the SHA authentication tag in SHA block 108 is also available due to the access duplication/transformation performed by access stealing monitor block 109.

IPsec decryption includes an AES decryption and at the same time a SHA authentication on the same input message block. To perform an IPsec decryption, the process is the same as the encryption process described above, except that the AES write access is duplicated and transformed into a SHA write access.

Microcontroller system 100 with access stealing as described above can be configured to implement multiple process combinations without the need of new block development. The number of memory accesses are reduced, thus increasing performance and decreasing internal bus load. System 100 is easy to program because no complex DMA channel handling is required and data synchronization is performed automatically. Therefore, microcontroller 100 (or SoC that that includes microcontroller 100) is easier to program, offers better performance, lowers development cost and has less risk of bugs.

Figure 2:
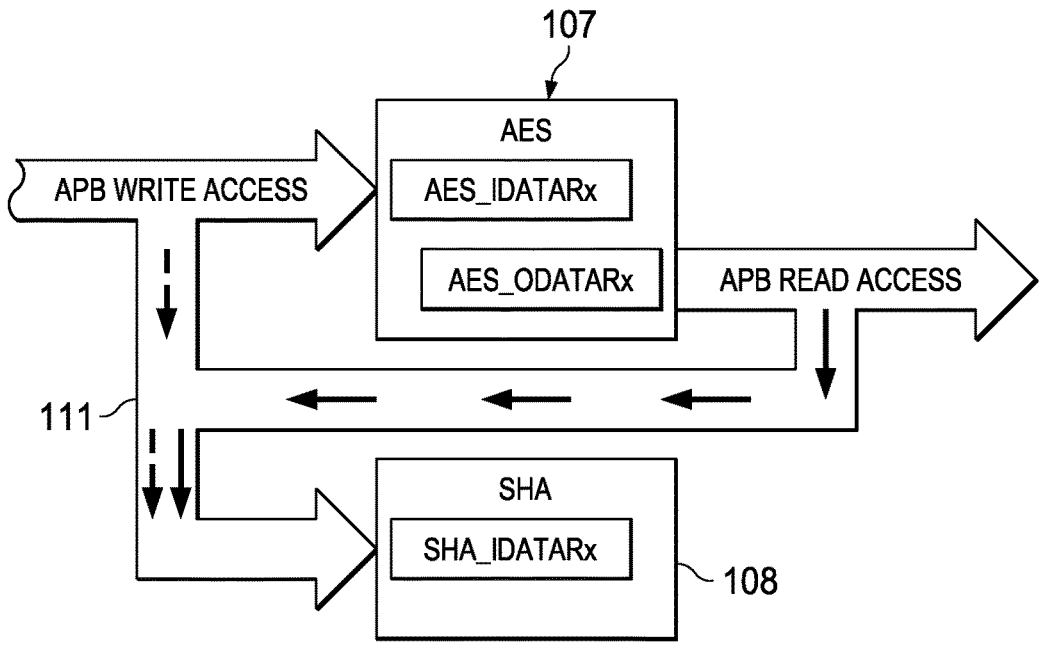
FIG. 2 is a conceptual block diagram illustrating access stealing for a secure protocol layer, according to an embodiment.

FIG. 2 is a conceptual block diagram illustrating access stealing for a secure protocol layer with process chaining. In the example embodiment shown, IPsec encryption includes message encryption followed by authentication of the encrypted message. Therefore, an AES encrypted data read access request (AES_IDATARx) is duplicated and transformed by AES block 107 into a write access request (SHA_IDATARx) on SHA block 108. IPsec decryption includes encrypted message decryption and encrypted message authentication performed at the same time. Therefore, AES data to decrypt write access is duplicated and transformed by SHA block 108 into a write access on SHA block 108.

Figure 3:
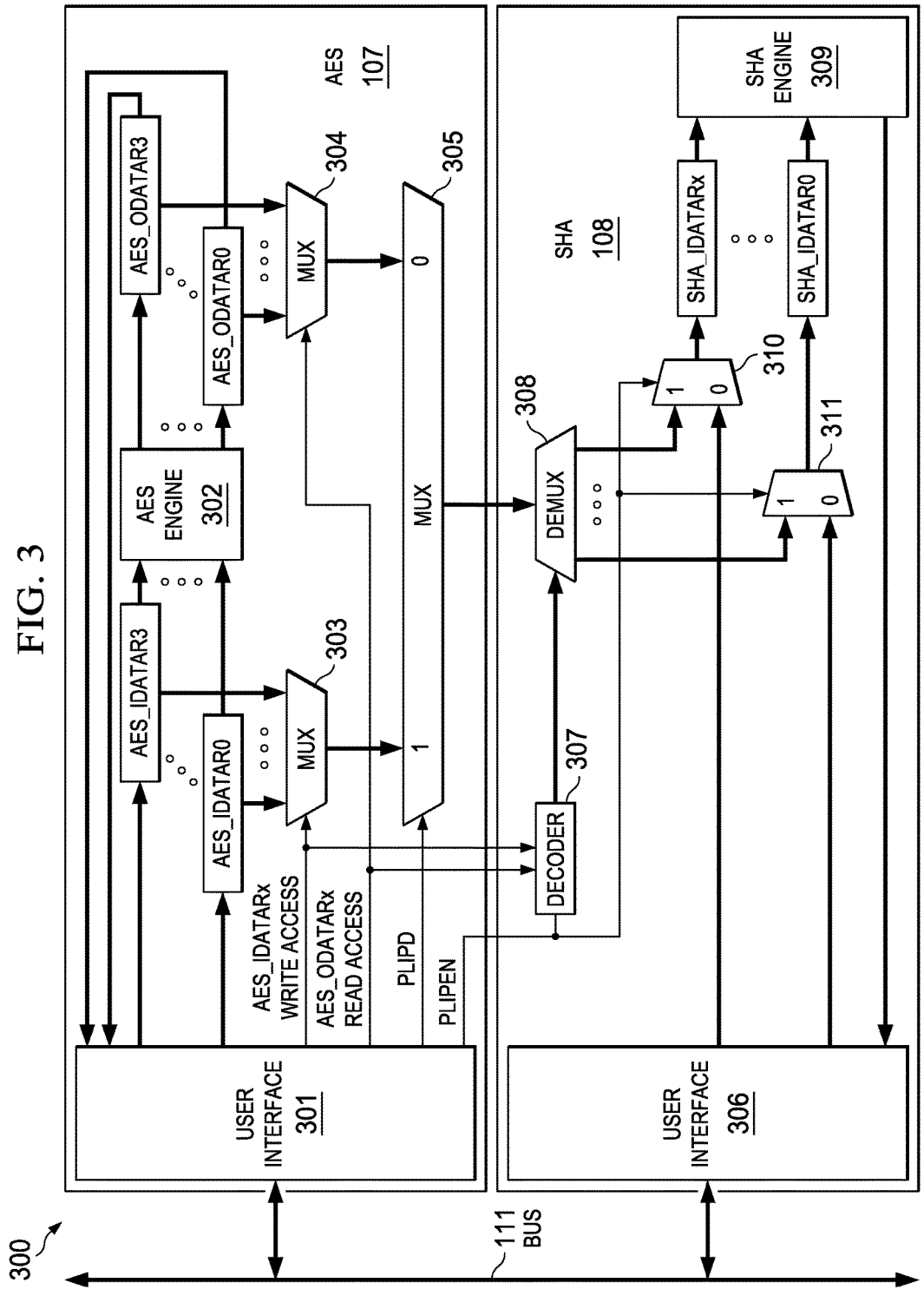
FIG. 3 is a conceptual block diagram of a chaining architecture for access stealing for a secure protocol layer, according to an embodiment.

FIG. 3 is a conceptual block diagram of a chaining architecture for access stealing for a secure protocol layer, according to an embodiment. In the embodiment shown in FIG. 3, AES block 107 and SHA block 108 are coupled to peripheral bus 111. AES block 107 is also coupled directly (separate from peripheral bus 111) to SHA block 108 by dedicated lines 312a-312c carrying signals AES_IDATARx write access, AES_ODATARx read access and PLIPEN, respectively. PLIPEN is used to enable the access stealing mechanism.

In an embodiment, AES block 107 includes user interface 301, AES engine 302 and multiplexers 303, 304, 305. An IPsec message input into AES block 107 can include four blocks, which can be stored in input registers AES_IDATAR0, AES_IDATAR1, AES_IDATAR2 and AES_IDATAR3. In FIG. 3, only input registers AES_IDATAR0 and AES_IDATAR3 are shown for clarity purposes. AES engine 302 implements AES encryption on the four blocks, generating AES encrypted message blocks, which are stored in output registers AES_ODATAR0, AES_ODATAR1, AES_ODATAR2 and AES_ODATAR3. The AES encrypted message blocks are output to bus 111 through user interface 301. User interface 301 includes circuitry to decode signals from bus 111 and generate register read/write actions.

Each of the AES input registers is an input into multiplexer 303. Multiplexer 303 is coupled to a first selection signal for routing one of the input registers to the output of multiplexer 303. The selection signal (AES_IDATARx write access) is received from peripheral bus 111 through user interface 301. Similarly, each of the output registers storing encrypted AES data is an input into multiplexer 304. Multiplexer 304 is coupled to a second selection signal for routing one of the output registers to the output of multiplexer 304. The selection signal (AES_ODATARx read access) is received from peripheral bus 111 through user interface 301. The inputs of multiplexer 305 are the outputs of multiplexers 303, 304. Multiplexer 305 is coupled to a third selection signal (PLIPD), which routes one of the outputs of multiplexers 303, 304 to SHA block 108.

In an embodiment, SHA block 108 includes user interface 306, decoder 307, demultiplexer 308, multiplexers 310, 311 and SHA engine 309. For clarity purposes, only the input registers SHA_IDATAR0 and SHA_IDATARx and associated multiplexers are shown in FIG. 3. In practice, there would be additional multiplexers and input registers for SHA_IDATAR1 and SHA_IDATAR2. User interface 306 is coupled to bus 111 and provides input to multiplexer 310 and multiplexer 311. Multiplexers 310, 311 are each coupled to a selection signal (PLIPEN), which indicates a stolen access mode. According to PLIPEN, the output of multiplexer 305 in AES block 107 is transferred to demultiplexer 308 in SHA block 108. Decoder 307 has inputs coupled to PLIPEN, AES_ODATARx read access and AES_IDATARx write access signals. In an embodiment, decoder 307 includes logic gates for comparing these signals and generating a selection signal for demultiplexer 308. In an embodiment, decoder 307 includes a counter that generates the selection signal for selecting first SHA_IDATAR0, then SHA_IDATAR1, . . . , SHA_IDATARx, then again SHA_IDATAR0 and so forth until all the data has been transferred. SHA engine 309 updates a SHA message digest based on the received data. The SHA digest can be read through user interface 306 and used for IPsec encryption/decryption. User interface 306 includes circuitry to decode signals from bus 111 and generate register read/write actions.

Example Process

Figure 4:
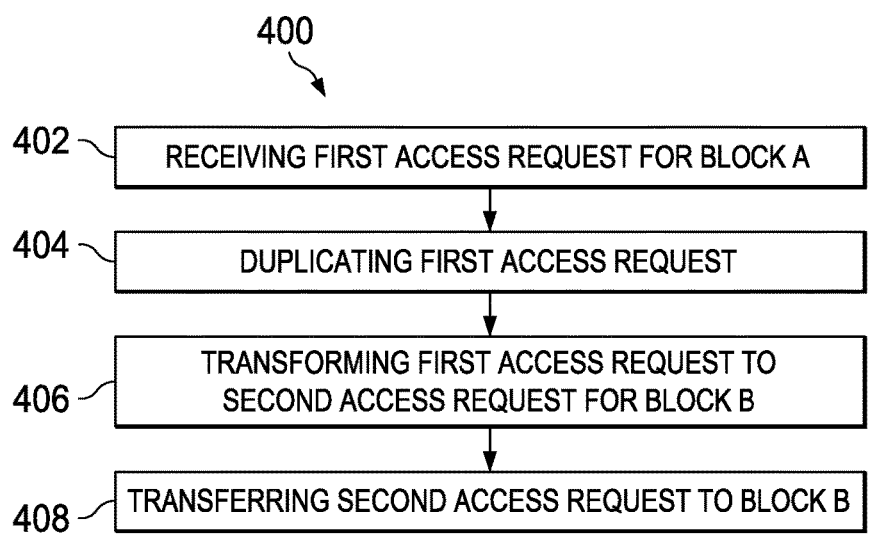
FIG. 4 is a flow diagram of an example process for access stealing, according to an embodiment.

FIG. 4 is a flow diagram of an example process 400 for access stealing, according to an embodiment. Process 400 can be implemented by, for example, by microcontroller system 100 shown in FIG. 1.

In an embodiment, process 400 can begin by receiving a first access request on a first processing block over a bus (402). In an embodiment, the first access request is a read access request. In an embodiment, the first access request is a write access request. The access request can be sent by, for example, a controller 102 over a bus or peripheral bus (e.g., peripheral bus 111).

Process 400 can continue by duplicating the first access request (404) and then transforming the first access request to a second access request on a second processing block (406). In an embodiment, the duplication and transformation can be performed by an access stealing monitor block coupled to the bus or included in a bus bridge (e.g., peripheral bus bridge). In an embodiment, the access stealing can be performed by hardwiring together peripherals that have chained processes. In an embodiment, process 400 can continue by transferring the second access request to the second block (408). In an embodiment, the transfer can be over a bus, as described in reference to FIG. 1. In an embodiment, the transfer can be over a hardwired connection between the first and second blocks, as described in reference to FIG. 3.

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A system comprising:
a bus;
memory coupled to the bus;
a first peripheral coupled to the bus;
a second peripheral coupled to the bus;
a controller coupled to the bus and configured to initiate access requests over the bus; and
an access stealing monitor coupled to the bus, the access stealing monitor configured to receive a read access request from the bus on the first peripheral, duplicate the first access request, transform the duplicated read access request to a write access request on the second peripheral, and transfer the write access request to the bus.

2. The system of claim 1, wherein the first peripheral is configured to process first data in response to the read access request and to generate second data, and the second peripheral is configured to process the second data and to write the second data in response to the write access request.

3. The system of claim 1, wherein the access stealing monitor is coupled to the second peripheral by one or more lines that are configured to indicate that the write access request is a stolen access request.

4. The system of claim 1, further comprising:
a bus bridge coupled to the bus and including the access stealing monitor.

5. The system of claim 4, wherein the bus bridge sends information to the second peripheral indicating that the write access request is a stolen access request.

6. A system comprising:
a bus;
memory coupled to the bus;
a controller coupled to the bus and configured to initiate access requests over the bus;
a first peripheral coupled to the bus and configured to receive a read access request from the bus for the first peripheral, duplicate the read access request and transform the duplicated read access request to a write access request; and
a second peripheral coupled to the bus and to the first peripheral, the second peripheral configured to receive the write access request and to respond to the write access request.

7. The system of claim 6, wherein the first peripheral is configured to process first data retrieved in response to the read access request and to generate second data and the second peripheral is configured to process the second data and to write the second data in response to the write access request.

8. A method comprising:
initiating, by a controller, a read access request over a bus, the read access request destined for a first peripheral coupled to the bus;
receiving, by an access stealing monitor coupled to the bus, the duplicated read access request;
duplicating, by the access stealing monitor, the read access request;
transforming, by the access stealing monitor, the read access request to a write access request on a second peripheral coupled to the bus and to the first peripheral; and transferring, by the access stealing monitor, the write access request to the bus.

9. The method of claim 8, further comprising:
processing, by the first peripheral, first data retrieved in response to the read access request and to generate second data; and
processing, by the second peripheral, the second data and to write the second data in response to the write access request.

10. A method comprising:
initiating, by a controller, a read access request over a bus, the read access request for a first peripheral coupled to the bus;
receiving, by the first peripheral, the read access request;
duplicating, by the first peripheral, the read access request;
transforming, by the first peripheral, the duplicated read access request to a write access request on a second peripheral coupled to the bus and to the first peripheral; and
transferring, by the first peripheral the write access request to the second peripheral.

11. A system comprising:
a bus;
memory coupled to the bus;
a first peripheral coupled to the bus;
a second peripheral coupled to the bus;
a controller coupled to the bus and configured to initiate access requests over the bus; and
an access stealing monitor coupled to the bus, the access stealing monitor configured to receive a write access request from the bus for the first peripheral, duplicate the write access request, transform the duplicated write access request to a read access request on the second peripheral, and transfer the read access request to the bus.

12. The system of claim 11, wherein the first peripheral is configured to write first data in response to the write access request, and the second peripheral is configured to read the first data in response to the read access request and to process the first data to generate second data.

13. A system comprising:
a bus;
memory coupled to the bus;
a controller coupled to the bus and configured to initiate access requests over the bus;
a first peripheral coupled to the bus and configured to receive a write access request from the bus for the first peripheral, duplicate the write access request and transform the duplicated write access request to a read access request; and
a second peripheral coupled to the bus and to the first peripheral, the second peripheral configured to receive the read access request and to respond to the read access request.

14. The system of claim 13, wherein the first peripheral is configured to write first data in response to the write access request, and the second peripheral is configured to read the first data in response to the read access request and to process the first data to generate second data.

15. A method comprising:
initiating, by a controller, a write access request over a bus, the write access request destined for a first peripheral coupled to the bus;
receiving, by an access stealing monitor coupled to the bus, the write access request;
duplicating, by the access stealing monitor, the write access request;
transforming, by the access stealing monitor, the duplicated write access request to a read access request on a second peripheral coupled to the bus and to the first peripheral; and
transferring, by the access stealing monitor, the read access request to the bus.

16. The method of claim 15, wherein the first peripheral is configured to write first data in response to the write access request, and the second peripheral is configured to read the first data in response to the read access request and to process the first data to generate second data.

17. A method comprising:
initiating, by a controller, a write access request over a bus, the write access request for a first peripheral coupled to the bus;
receiving, by the first peripheral, the write access request;
duplicating, by the first peripheral, the write access request;
transforming, by the first peripheral, the duplicated write access request to a read access request on a second peripheral coupled to the bus and to the first peripheral; and
transferring, by the first peripheral the read access request to the second peripheral.

18. The method of claim 17, wherein the first peripheral is configured to write first data in response to the write access request, and the second peripheral is configured to read the first data in response to the read access request and to process the first data to generate second data.

* * * * *